W. R. HESLEWOOD.
FUME CONDENSING APPARATUS.
APPLICATION FILED JAN. 6, 1913.
Reissued Feb. 10, 1914.
13,684.
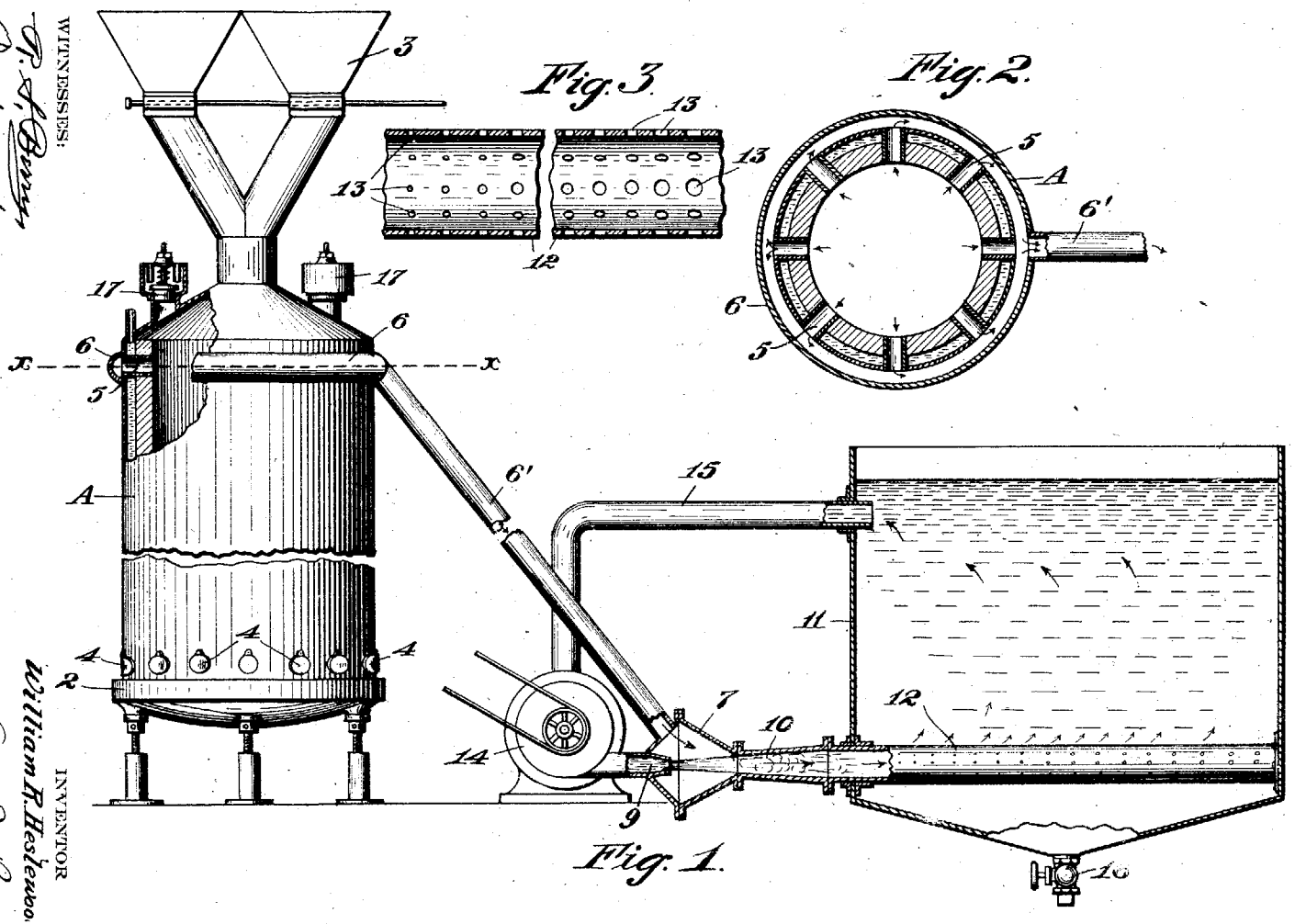
WITNESSES:
R. S. Berry
Beatrice Abrams
INVENTOR
William R. Heslewood
BY George W. Ramsey
Asse. ATTORNEY

UNITED STATES PATENT OFFICE.

WILLIAM R. HESLEWOOD, OF OAKLAND, CALIFORNIA, ASSIGNOR, BY MESNE ASSIGNMENTS, TO SOUTH FORK SMELTING COMPANY, OF OAKLAND, CALIFORNIA, A CORPORATION OF CALIFORNIA.

FUME-CONDENSING APPARATUS.

13,684. Specification of Reissued Letters Patent. Reissued Feb. 10, 1914.

Original No. 980,257, dated January 3, 1911, Serial No. 546,498. Application for reissue filed January 6, 1913. Serial No. 740,574.

*To all whom it may concern:*

Be it known that I, WILLIAM R. HESLEWOOD, a citizen of the United States, residing at Oakland, in the county of Alameda and State of California, have invented new and useful Improvements in Fume-Condensing Apparatus, of which the following is a specification.

This invention relates to an apparatus for condensing fumes and particularly pertains to the water type of fume condenser.

It is the object of this invention to provide a fume condensing apparatus in which the fumes and gases generated in smelting furnaces are forced through a volume of water, and by means of which the volatile materials will be precipitated and condensed for further treatment.

A further object is to provide means for drawing the fumes through the water volume and means for breaking the current of gases so as to cause them to pass through the water in small bubbles or globules so as to bring them in intimate contact with the water, and thus facilitate condensation.

Another object is to provide means for maintaining a continuous circulation of the water and thereby aid the condensing process.

The invention consists of the parts and the construction and combinations of parts as hereinafter more fully described and claimed, having reference to the accompanying drawings, in which—

Figure 1 is a side view of the invention partly in section. Fig. 2 is a section on the line *x x*, Fig. 1. Fig. 3 is a section of the perforated pipe on an enlarged scale showing the graduated perforations.

In the drawings A represents a furnace or kiln which may be of any suitable type and construction, and is here shown as a smelting furnace of the cupola type, having a hearth 2 at its lower end and charging hoppers or gallery 3 at its upper end. A series of dampered orifices or air inlets 4 are disposed at intervals around the furnace A a little above the hearth 2.

A series of vents 5 are provided in the upper end of the furnace A, which open into an outside surrounding trunk 6, having a suction pipe construction 6′ through which the fumes and gases generated in the furnace A may be drawn, as later described. The suction pipe 6′ leads to any suitable point and terminates in a case or suction chamber 7, which is constructed as shown in Fig. 3, and consists of two bell-shaped or opposed conical sections which are bolted together at their mouths. A nozzle 9 projects axially into the case 7 and discharges into the contracted throat 10, which latter has a flared imperforate extension projecting into a tank 11 and terminating within the tank in a perforated section 12. The pipe 12 is horizontally disposed and extends across the water containing tank or condensing reservoir 11 at a point a little above the bottom of the latter.

The perforations 13 in the pipe 12 are graduated in size, as shown in Fig. 3, those nearest the throat 10 being about ¼″ in diameter, and those at the opposite end of the pipe being nearly one inch in diameter, the object of which will become apparent hereinafter.

The nozzle 9 is connected with a centrifugal pump 14, which has its inlet connected to a circulating pipe 15 leading to the upper portion of the tank or reservoir 11, and terminating beneath the surface of the water therein.

In practice the pump 14 is operated from any suitable source of power and acts to draw a volume of water from the tank 11 and force it at high pressure and great velocity through the nozzle 9. The rapidly moving jet is directed by the nozzle 9 across the chamber 7, and entering the throat 10 passes into the pipe 12. This action tends to create a vacuum in the chamber 7, and thus causes a suction to take place therein so as to draw a continuous current of gases and fumes, previously generated in the furnace A, through the suction pipe 6′, the gases entering the pipe 6′ through the vents 5.

The hot gases and fumes on entering the chamber 7 are subjected to the cooling action of the jet or stream of water emerging from the nozzle 9 and are thereby condensed to a considerable degree, that is, the vapor, gas, smoke, or fumes are brought into direct or immediate contact with the jet of cold water, thereby causing an abstraction of heat and a reduction of the gas or fumes to a denser form, such as a liquid or a solid. This reduction of the gas and fumes in the chamber 7 increases the suction therein, thereby relieving the ejector of considerable work, both in creating a suction and in the volume of gases handled. This feature increases the efficiency of the ejector. The condensed gases are then carried forward by the stream discharging from the nozzle 9 and are drawn into the throat 10 where they are caused to be finely divided and thoroughly mingled with the water by reason of the latter being highly agitated as it passes through the throat 10. The finely divided and condensed gases are forced by the stream into the pipe 12, from whence they pass through the perforations 13 into the liquid in the tank 11.

The perforations 13 being graduated in size, as above described, insure the gases and fumes being distributed throughout the length of the pipe 12 before passing into the tank. The fumes on leaving the distributing pipe 12 are subjected to the cooling and condensing action of the water in the tank 11, so that the volatile or condensable matters, vapors and substances therein will become precipitated and settle to the bottom of the tank from whence they are removed for further treatment in any suitable manner, as through the trap 16. The agitation of the water in the tank A, due to its constant circulation through the pump 14, also aids the condensing action, besides rendering the apparatus continuous, and economical in the use of water.

Relief valves 17 are suitably disposed in the head of the furnace A, so as to permit of the escape of such gases as might accumulate in the furnace A in the event the suction apparatus should get out of order.

The ejector formed by the casing 7, nozzle 9 and throat 10, not only acts to draw the fumes from the furnace and force them into the water in the tank 11, but also operates to draw air into the furnace through the orifices 4, such air as enters the furnace through the orifices 4 displacing the fumes or gases drawn therefrom by the ejector. As the volume of the fumes removed from the furnace and the amount of air delivered thereto by the ejector depends upon the velocity of the stream discharged from the nozzle 9, the volume of air drawn into the furnace can be regulated by adjusting the speed of the pump 10 to vary the force and velocity of the stream as desired. This permits of only such quantity of air being drawn into the furnace as is necessary for the complete combustion of the fuel therein or the oxydizing of the ores being smelted, so that no excess of air and consequent excess of fumes will result.

The intake pipe 15 leading from the tank 11 to the pump 10 leads from the tank at a point below the surface of the water therein so that when the pump is operated to draw the water from the tank and discharge it through the nozzle 9, no air will be drawn into the pump and deliverd into the casing 7 with the jet. The pipe 6′ leading from the fume outlets of the furnace opening direct to the interior of the casing 7, and the jet from the nozzle 9 being free from air, the fumes drawn from the furnace will be immediately forced into the liquid in the tank without coming in contact with the atmosphere. This is advantageous in that fumes, such as sulfur vapor, which on mixing with the oxygen of the air are converted into sulfur dioxid, can be condensed in the tank; whereas if oxygen is allowed to combine with the fumes to form sulfur dioxid, this objectionable gas can not be broken down and condensed by the action of the water. To suddenly introduce the fumes from the furnace while at a high temperature into a body of water without the fumes coming in contact with air, comprises a very valuable and important feature of this invention which is rendered possible by the device here shown.

By the use of the hydraulic ejector the fumes can be drawn from the furnace and forced into a body of water at a considerable depth.

Having thus described my invention, what I claim and desire to secure by Letters Patent is:

1. A fume condensing apparatus having in combination a tank, a horizontally arranged pipe therein, said pipe having perforations of different diameters from one end to the other, a hydraulic ejector connected with one end of said pipe, a fume conduit connected with the ejector, said ejector comprising a casing formed of two separable bell-shaped or conical sections bolted together with their wider ends abutting, a restricted throat forming a discharge continuation of one of said sections, a nozzle extending into the smaller end of one of the sections and in line with said throat, a centrifugal pump connected with the nozzle, and a supply pipe for the pump connected with the upper portion of the tank whereby a continuous circulation may take place through the tank and ejector and said perforated pipe.

2. In a fume condensing apparatus, the combination of a tank, a hydraulic ejector, a fume conduit connected with the ejector, said ejector comprising a casing formed of two bell-shaped or conical sections having their wider ends abutting, a restricted throat forming a discharge continuation of one of said sections and opening into the tank below the surface of a liquid therein, a nozzle extending into the smaller end of one of the sections and in line with the throat, a pump connected with the nozzle, and a supply pipe for the pump connected with the tank.

3. A fume condensing apparatus comprising a tank, a horizontally arranged perforated pipe therein, a hydraulic ejector connected with one end of said pipe, a fume conduit connected with the ejector, said ejector comprising a casing formed of two bell-shaped or conical sections having their wider ends abutting, a restricted throat forming a discharge continuation of one of said sections, a nozzle extending into the smaller end of one of the sections and in line with the throat, a pump connected with the nozzle, and a supply pipe for the pump connected with the tank.

In witness whereof I have hereunto set my hand in the presence of two subscribing witnesses.

WILLIAM R. HESLEWOOD.

Witnesses:
J. A. HESLEWOOD,
ORR M. CHENOWETH.